United States Patent

[11] 3,608,684

| | | |
|---|---|---|
| [72] | Inventor | William J. Shimanckas<br>Waukegan, Ill. |
| [21] | Appl. No. | 872,142 |
| [22] | Filed | Oct. 29, 1969 |
| [45] | Patented | Sept. 28, 1971 |
| [73] | Assignee | Outboard Marine Corporation<br>Waukegan, Ill. |

[54] CLUTCH FOR MARINE PROPULSION DEVICE
8 Claims, 8 Drawing Figs.

[52] U.S. Cl. .................................................. 192/20,
74/107, 74/110, 74/417, 115/17, 192/24, 192/26,
192/41 S, 192/67 R
[51] Int. Cl. .................................................. F16d 11/04,
F16d 41/20, B63h 21/28
[50] Field of Search ........................................... 192/20, 41
S, 24, 26, 67 R, 93 A, 93 R; 74/405, 417, 423, 107,
110; 115/17, 34

[56] References Cited
UNITED STATES PATENTS

| | | | |
|---|---|---|---|
| 900,984 | 10/1908 | Coe ............................ | 74/107 X |
| 1,385,806 | 7/1921 | Voss ........................... | 74/405 |
| 2,026,481 | 12/1935 | Mathias ....................... | 192/67 X |
| 2,185,457 | 1/1940 | Conover ....................... | 115/17 |
| 2,326,138 | 8/1943 | Grant, Jr. ..................... | 74/110 |
| 2,642,970 | 6/1953 | Szekely ....................... | 192/67 X |
| 2,672,115 | 3/1954 | Conover ....................... | 115/17 |
| 2,718,792 | 9/1955 | Kiekhaefer ................... | 115/34 X |
| 2,728,320 | 12/1955 | Kloss ........................... | 192/41 S |
| 2,756,537 | 7/1956 | Ernst ........................... | 192/67 X |
| 2,756,855 | 7/1956 | Kloss ........................... | 192/41 S |

*Primary Examiner*—Allan D. Herrmann
*Attorneys*—Robert E. Clemency, John W. Michael, Gerrith Foster, Bayard H. Michael, Paul R. Puerner, Joseph A. Gemignani, Andrew O. Riteris, Spencer B. Michael and Robert K. Gerling ABSTRACT: Disclosed herein is a marine propulsion device which affords reverse operation by rotation of the drive shaft housing about a vertical axis and which includes a clutch in the lower unit gear case for selectively engaging or disengaging the propeller shaft with the drive shaft. The clutch is responsive to axial movement of the drive shaft caused by moving a control handle accessible to the operator. The drive shaft has splines at each end, which splines permit axial movement of the drive shaft while maintaining a driving connection between the engine output shaft and a first bevel gear in the lower unit gear case. In one embodiment of the invention, the clutch includes a torsion spring which normally grips the hub of a second bevel gear rotatably carried by the propeller shaft to secure the gear to the propeller shaft. Downward axial movement of the drive shaft interferes with rotary movement of the spring with the propeller shaft and thus unwinds the spring to release the grip of the spring on the bevel gear hub to disconnect the second gear from the propeller shaft. In another embodiment, downward movement of the drive shaft causes an axial projection on the lower end of the drive shaft to engage an axially inclined cam surface located on a clutch dog which is splined to the propeller shaft to shift the clutch dog axially and disengage the clutch dog from the bevel gear on the propeller shaft and interrupt transfer of power from the gears to the propeller shaft.

PATENTED SEP 28 1971
3,608,684
SHEET 1 OF 2
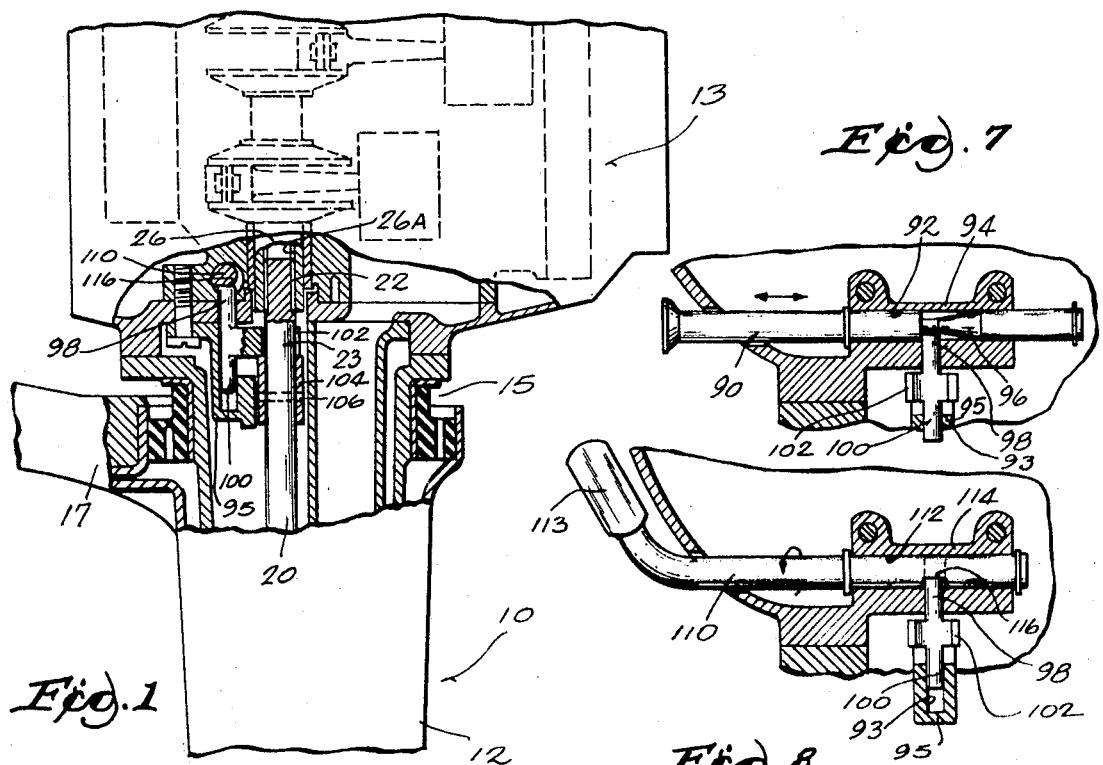
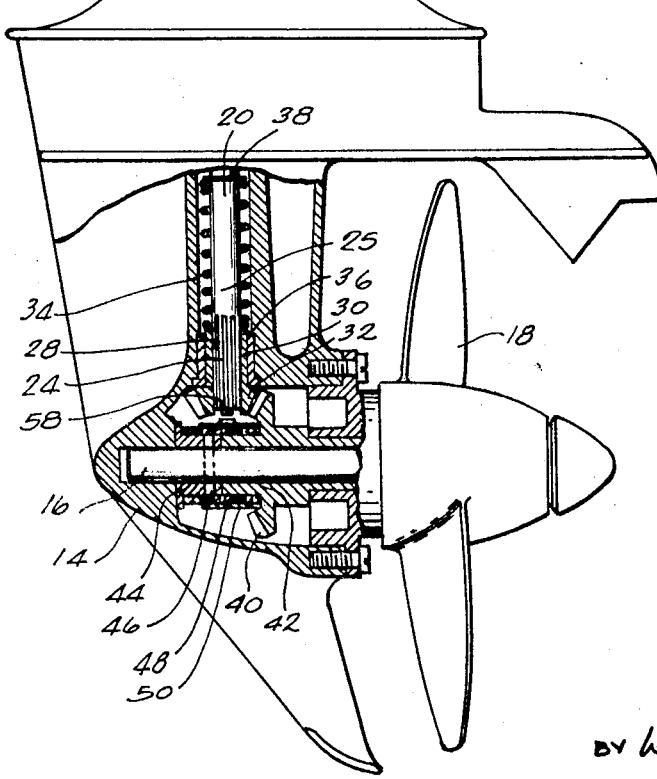
INVENTOR
WILLIAM J. SHIMANCKAS
BY Wheeler, Wheeler, House & Clemency
ATTORNEYS

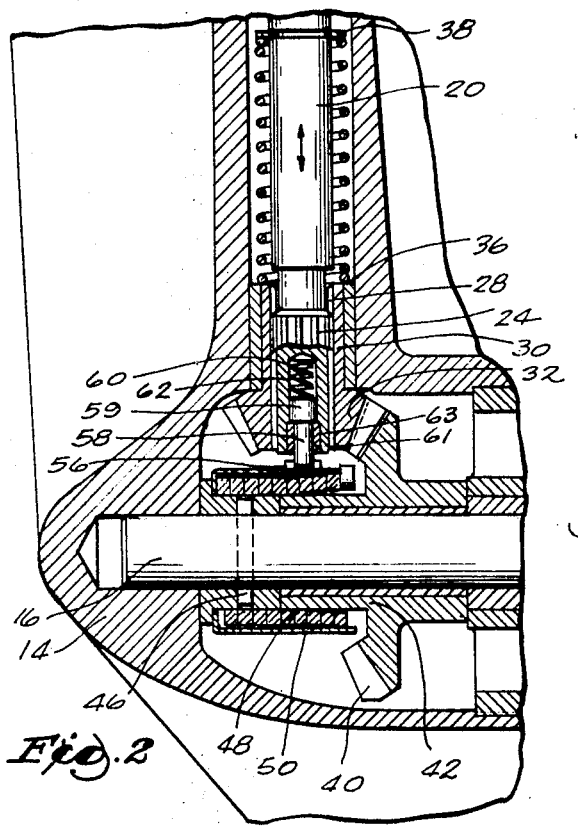
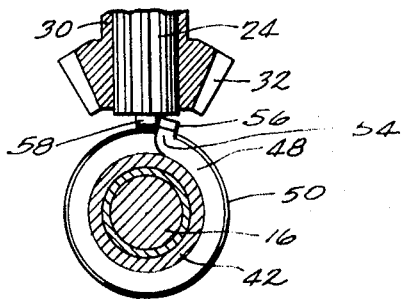
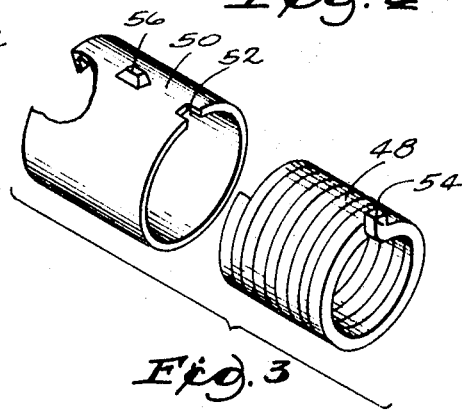
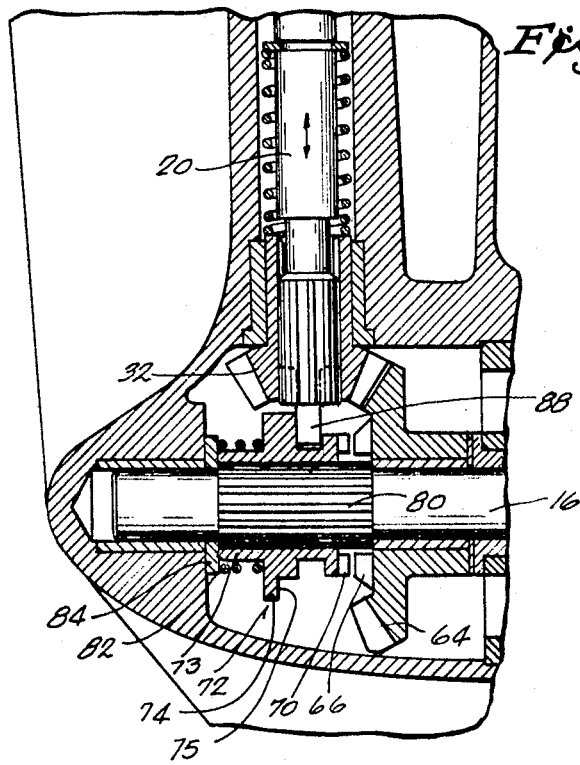
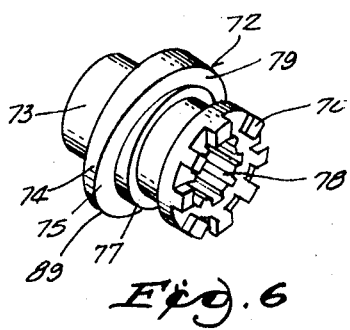

CLUTCH FOR MARINE PROPULSION DEVICE

BACKGROUND OF INVENTION

The invention relates to marine propulsion devices, and more particularly to a clutching arrangement which provides a neutral condition with no propeller rotation in a marine propulsion device in which the drive shaft housing and powerhead are rotatable for 360° to afford reverse hull movement as shown in U.S. Pat. Nos. 2,656,827 and 2,732,819

SUMMARY OF INVENTION

The invention provides an inexpensive clutch for the lower unit gear case of a marine propulsion device of the type in which rearward movement of the boat hull is accomplished by rotating the powerhead and drive shaft housing about a generally upright axis, rather than by reversing the direction of propeller rotation by shifting gears. The clutch is actuated by moving the drive shaft axially by a control handle located in the engine control panel.

More particularly the invention provides a marine propulsion device including a drive shaft mounted in a drive shaft housing for both rotary and axial movement, together with a gear rotatably carried by the housing in coaxial relation to a propeller shaft and in mesh with a first gear on the drive shaft, and means operable in response to axial movement of the drive shaft to selectively engage and disengage the propeller shaft and the gear mounted in coaxial relation thereto.

In one embodiment of the invention, a bevel gear splined to the lower end of an axially shiftable drive shaft is in mesh with a propeller rotatably carried by the propeller shaft. A torsion spring is wrapped around a bushing secured to the propeller shaft and also the hub of the gear on the propeller shaft to prevent relative rotation between the gear and the propeller shaft. The spring is enclosed by a sleeve with a radial projection. The sleeve also has a notch which receives an out-turned end of the spring and sleeve rotate with the propeller shaft when the clutch is in a drive condition. The gear on the propeller shaft is disengaged from the propeller shaft to provide a neutral condition with no propeller rotation by moving the drive shaft axially so that a spring-loaded tappet or axial projection at the lower end of the drive shaft engages the radial projection on the sleeve to prevent or interfere with rotation of the spring and sleeve, and thus unwrap the spring from its grip on the hub of the propeller shaft gear.

In a further embodiment of the invention, the propeller shaft gear is detachably secured to the propeller shaft by an axially shiftable clutch dog which is splined to the propeller shaft and which has axially extending teeth which are engageable with the propeller shaft gear. The clutch dog is provided with an axially inclined cam surface which is engageable with an axial projection on the end of the drive shaft. When the drive shaft is shifted axially downwardly the clutch dog is cammed axially away from the gear on the propeller shaft to permit relative rotation between the propeller shaft and the propeller shaft gear, and thus provide neutral operation with no rotation of the propeller shaft. Means are also provided for biasing the drive shaft axially upwardly so that the lower end of the drive shaft is in a position of nonengagement with the clutch.

The invention also provides means for axially shifting the drive shaft. In one embodiment, the drive shaft is shifted axially by movement of a push rod which is reciprocally mounted for movement about an axis transverse to the axis of the drive shaft. The push rod has a tapered shoulder which engages a plunger to move the plunger axially about an axis parallel to the axis of the drive shaft. The plunger includes a yoke which surrounds the drive shaft and bears against a bushing secured to the drive shaft.

In a further embodiment, axial movement of the drive shaft is afforded by rotating a crank provided with an eccentric surface which cooperates with the plunger to shift the plunger and the yoke axially of the drive shaft.

It is an object of the invention to provide an arrangement for operating a clutch located in the lower unit gear case with a minimum of components and at a minimum cost of construction.

It is an other object of the invention to provide a clutch in the lower unit gear case which is operated by axially shifting the drive shaft.

It is an additional object of the invention to provide a clutch for a marine propulsion device in which rearward movement of the associated boat hull is accomplished by rotating the powerhead and drive shaft housing 180° about a vertical axis and in which the clutch is operated by moving the drive shaft axially.

Further objects and advantages of the present invention will become apparent from the following disclosure.

DESCRIPTION OF THE DRAWINGS

FIG. 1 is a fragmentary side elevational view with portions removed showing a marine propulsion device in accordance with the invention.

FIG. 2 is a fragmentary enlarged sectional view of the lower unit gear case shown in FIG. 1.

FIG. 3 is a fragmentary exploded perspective view of the spring and spring sleeve shown in FIG. 2.

FIG. 4 is a fragmentary sectional end view of the lower unit gear case shown in FIG. 2.

FIG. 5 is a fragmentary enlarged side view of a further embodiment of the invention.

FIG. 6 is a perspective view of the clutch dog shown in FIG. 5.

FIG. 7 is a fragmentary view in partial section of the control member.

FIG. 8 is a fragmentary view in partial section of a further embodiment of the control member.

DETAILED DESCRIPTION

In the drawings, FIG. 1 discloses a marine propulsion device which is generally designated 10, and which includes a drive shaft housing 12 and a lower unit gear case 14. The drive shaft housing 12 is connected to a powerhead 13 and is rotatably supported within a bearing 15 in the clamp bracket 17 for 360° movement to afford steering in all directions and reverse hull movement. The gear case 14 rotatably supports a propeller shaft 16 which is provided with a propeller 18. The marine propulsion device also includes a drive shaft 20.

In accordance with the invention, means are provided for mounting the drive shaft 20 in the drive shaft housing 12 to afford rotary and axial movement of the drive shaft 20. As disclosed, the means includes an external spline 22 at the upper end 23 of the drive shaft 20 and an external spline 24 at the lower end 25 of the drive shaft 20. The upper end spline 22 is received in an internal spline 26A in an engine output shaft 26. The lower end spline 24 is received in an internal spline 28 in the hub 30 of a bevel gear 32 (FIGS. 1 and 2).

The means for mounting the drive shaft also includes means for yieldably biasing the drive shaft 20 upwardly in the drive shaft housing 12. As disclosed, the means comprises a spring 34 (FIG. 2) arranged around the drive shaft 20. The lower end of the spring 34 bears against a shoulder 36 on the drive shaft housing 12. The upper end of the spring engages a cross pin 38 which extends through the drive shaft 20. The spring 34 biases the drive shaft into a position of nonengagement with the clutching mechanism, as hereinafter described.

In accordance with the invention, means are provided for selectively drivingly connecting and disconnecting the drive shaft 20 with the propeller shaft 16 to provide rotation of the propeller shaft 16 with the drive shaft and to provide a neutral condition with no rotation of the propeller shaft when the drive shaft is rotating. As disclosed, the means includes a bevel gear 40 having a gear hub 42. The gear 40 is rotatably carried by the propeller shaft 16 and is in mesh with the bevel gear 32, which is driven by the drive shaft 20, and which also forms a part of the means for connecting the drive shaft with the propeller shaft. In the embodiment of the clutch disclosed in FIGS. 1 and 2, a bushing 44 is pinned to the drive shaft by a pin 46 and a torison spring 48 is wrapped around the bushing 44 and the hub 42, and is normally in clamping engagement on the bushing 44 and the hub 42 to secure the gear 40 to the propeller shaft 16 and prevent relative rotation between the gear 40 and the propeller shaft 16.

The spring 48 is enclosed by a sleeve 50 which is concentric with the spring 48 and the propeller shaft 16. The sleeve 50 is provided with a notch 52 which receives an out-turned end 54 of the spring 48. The sleeve 50 is also provided with a radial projection 56 which is engaged by a spring-loaded tappet 58 having a head 59. To ensure engagement of the tappet with the projection 56 and accommodate overtravel of the shifting control apparatus hereinafter described, the tappet 58 is biased downwardly by a spring 60 which is located in a bore 62 in the lower end 25 of the drive shaft 20. A bushing 61 located in a counterbore 63 engages the tappet head 59 to keep the tappet 58 in the bore 62. When the drive shaft is shifted axially downwardly as hereinafter described, the tappet 58 engages the projection 56 and thus prevents or interferes with rotation of the sleeve 50 and the spring 48 and unwraps or unwinds the spring 48 to release the grip of the spring on the gear hub 42 and disengage the gear 40 from the propeller shaft 16.

In the embodiment of the invention disclosed in FIG. 5, the means provided for selectively drivingly connecting and disconnecting the drive shaft 20 with the propeller shaft 16 includes a bevel gear 64 which is rotatably carried by the propeller shaft 16 and which is in mesh with the bevel gear 32 driven by the drive shaft 20. The gear 64 is provided with projections 66 which engage axially extending teeth 70 on an axially shiftable clutch dog 72. The clutch dog 72 includes a hub portion 73 and a concentric flange 74. The flange 74 is provided with an axially inclined ramp or cam surface 75 which is desirably in the form of a helix. The cam surface 75 is spaced radially outwardly from the hub portion 73 to form a shoulder 77 which extends around the hub 73 and merges with the axially thick portion 79 of the flange 74.

The clutch dog 72 has an internal spline 78 which interfits with an external spline 80 on a propeller shaft to thus transfer power from the drive shaft to the propeller shaft when the teeth 70 are in engagement with the projections 66 on the gear 64.

In order to maintain the clutch dog 72 in engagement with the gear 64 during normal running operation, the means for selectively drivingly connecting and disconnecting the drive shaft 20 and the propeller shaft 16 includes biasing means in the form of a spring 82 arranged around the hub 73 of the clutch dog 72 and located between the washer 84 and the flange 74.

In operation of the embodiment disclosed in FIG. 5, downward axial movement of the drive shaft 20 causes engagement of an axial projection 88 on the drive shaft with the cam surface 75 to axially shift the clutch dog 70 away from the gear 64 to disengage the gear 64 from the propeller shaft 16. The projection 88 can only move radially inwardly toward the axis of the propeller shaft 16 and past the outside diameter of the flange 74 when the axially thin portion 89 of the flange 74 revolves past the projection 88. After the clutch dog 72 has moved axially away from the gear 64, the projection 88 is engaged against the shoulder 77 to maintain the clutch dog 72 in the neutral position. The projection 88 can be rigid or in the form of a spring-biased tappet, as described in the embodiment set forth in FIG. 2. A rigid projection 88 will provide a positive feel of the axial movement of the clutch dog 72 as the shifting rod or shifting crank is manipulated, as hereinafter described. Pressure will be required on the shifting rod until the projection 88 moves adjacent to the hub 73 and against the shoulder 77, as shown in FIG. 5.

In accordance with the invention, means are provided for axially moving the drive shaft. As disclosed in FIG. 7, the means includes a push rod 90 which is axially reciprocal in a bore 92 in a support member 94. The push rod 90 includes an axially tapered surface 96 which engages the upper end 98 of the plunger 100 which is supported in a bore 93 in a member 95 for axial movement parallel to the axis of the drive shaft 20. The plunger 100 is provided with means engageable with the drive shaft 20. As disclosed, the means is in the form of a yoke or apertured flange 102 which partially surrounds the drive shaft 20 and extends transversely to the axis of movement of the plunger 100. The yoke 102 bears against a sleeve 104 which is secured by a pin 106 to the drive shaft 20. Axial movement of the push rod 90 causes engagement of the tapered surface 96 with the end 98 of the plunger 100 and consequent axial movement of the plunger 100, which thus causes a corresponding axial movement of the drive shaft 20 to effect disengagement of the bevel gear 40 from the propeller shaft 16.

In the embodiment disclosed in FIG. 8, the means for axially shifting the drive shaft comprises a crank 110 which is rotatably supported in a bore 112 in the support member 114. The crank is provided with a handle 113 and with an eccentric surface 116 which is in engagement with an upper end 98 of the plunger 100. Rotation of the handle 112 and thus the eccentric surface 116 causes vertical axial movement of the plunger 100 to thus shift the drive shaft downwardly and axially to disengage the gear 40 from the propeller shaft 16 and provide a neutral condition.

The embodiments of the means for axially shifting the drive shaft shown in FIGS. 7 and 8 can be used interchangeably with either of the embodiments of the clutch shown in FIGS. 2 and 4.

Various features of the invention are set forth in the following claims.

1. A marine propulsion device comprising a drive shaft housing, a drive shaft, means for mounting said drive shaft in said drive shaft housing to afford rotary and axial movement of said drive shaft, a propeller shaft rotatably carried by said housing, a first gear on said drive shaft, a second gear freely rotatably carried by said housing in coaxial relation to said propeller shaft and in mesh with said first gear, and means operable in response to axial movement of said drive shaft to selectively engage and disengage said second gear with respect to said propeller shaft.

2. A marine propulsion device in accordance with Claim 1 wherein said means to selectively engage and disengage said second gear with said propeller shaft includes a hub extending axially from said second gear, a spring concentric with said propeller shaft, said spring including a first portion wrapped around said hub and a second portion wrapped around said propeller shaft, said spring being normally in clamping engagement on said hub and said propeller shaft, and a radial projection on said spring engageable with said drive shaft upon axial movement of said drive shaft to unwrap said spring on said hub and disengage said second gear from said propeller shaft.

3. A marine propulsion device in accordance with claim 1 wherein said means to selectively engage and disengage said second gear with said propeller shaft includes a clutch dog mounted on said propeller shaft to afford axial movement of said clutch dog relative to said propeller shaft and rotary movement with said propeller shaft, said clutch dog being engageable with said second gear to afford common rotation therewith upon axial movement of said clutch dog toward said second gear and means on said clutch dog and on said drive shaft to axially shift said clutch dog upon axial movement of said drive shaft.

4. A marine propulsion device in accordance with Claim 1 including means connected to said drive shaft for axially moving said drive shaft to selectively engage and disengage said second gear with said propeller shaft.

5. A marine propulsion device in accordance with claim 4 wherein said means connected to said drive shaft for axially moving said drive shaft comprises a push rod supported for axial movement in a direction transverse to the axis of said drive shaft, said push rod including an axially tapered surface, a plunger supported for movement parallel to said drive shaft and transverse to said push rod and having an end engaged with said tapered surface, and means on said plunger engageable with said drive shaft to move said drive shaft axially in response to movement of said push rod.

6. A marine propulsion device in accordance with claim 4, wherein said means connected to said drive shaft for axially moving said drive shaft comprises a crank including a shaft mounted for rotary movement and including an eccentric surface, a plunger mounted for axial movement parallel to said drive shaft and connected to said drive shaft, and said plunger having an end engaged with said eccentric surface on said crank to afford axial movement of said drive shaft in response to rotary movement of said crank.

7. A marine propulsion device comprising a drive shaft housing, an engine output shaft having an internal spline, a first gear rotatably supported in said drive shaft housing and having an internal spline, a drive shaft having an external upper end spline and an external lower end spline, and mounted in said drive shaft housing for rotary and axial movement, said upper end spline being reciprocally received in said output shaft spline and said lower end spline being reciprocally received in said first gear spline, a propeller shaft rotatably supported in said drive shaft housing, a second gear rotatably supported in said drive shaft housing in coaxial relation to said propeller shaft and in mesh with said first gear connected to said drive shaft, means operable in response to axial movement of said drive shaft for selectively engaging and disengaging said second gear with respect to said propeller shaft and means connected to said drive shaft for axially moving said drive shaft.

8. A marine propulsion device in accordance with claim 7, including means for yieldably biasing said drive shaft into a position of nonengagement with said means operable in response to axial movement of said drive shaft.